(12) United States Patent  
Fujiwara

(10) Patent No.: US 9,180,837 B2  
(45) Date of Patent: Nov. 10, 2015

(54) SIDE AIRBAG DEVICE FOR VEHICLE

(71) Applicant: Toyota Jidosha Kabushiki Kaisha, Toyota-shi Aichi-ken (JP)

(72) Inventor: Yusuke Fujiwara, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/487,609

(22) Filed: Sep. 16, 2014

(65) Prior Publication Data

US 2015/0076801 A1  Mar. 19, 2015

(30) Foreign Application Priority Data

Sep. 19, 2013  (JP) ................................. 2013-194220

(51) Int. Cl.
| | |
|---|---|
| B60R 21/16 | (2006.01) |
| B60R 21/239 | (2006.01) |
| B60R 21/233 | (2006.01) |
| B60R 21/231 | (2011.01) |

(52) U.S. Cl.
CPC ............ B60R 21/239 (2013.01); B60R 21/231 (2013.01); B60R 21/233 (2013.01); B60R 21/23138 (2013.01); B60R 2021/23146 (2013.01); B60R 2021/23316 (2013.01)

(58) Field of Classification Search
CPC ................ B60R 21/239; B60R 21/233; B60R 21/23138; B60R 2021/23146; B60R 2021/23316

See application file for complete search history.

(56) References Cited

U.S. PATENT DOCUMENTS

| | | | | |
|---|---|---|---|---|
| 5,586,782 | A * | 12/1996 | Zimmerman et al. | 280/730.2 |
| 5,853,191 | A * | 12/1998 | Lachat | 280/730.2 |
| 5,895,070 | A * | 4/1999 | Lachat | 280/730.2 |
| 6,349,964 | B1 | 2/2002 | Acker et al. | |
| 7,637,530 | B2 * | 12/2009 | Yamaji et al. | 280/730.2 |
| 2012/0235389 | A1 * | 9/2012 | Suzuki | 280/730.2 |
| 2013/0200598 | A1 | 8/2013 | Honda et al. | |
| 2014/0151984 | A1 * | 6/2014 | Fukawatase et al. | 280/730.2 |

FOREIGN PATENT DOCUMENTS

| | | |
|---|---|---|
| JP | 04-356246 A | 12/1992 |
| JP | 2000-177527 A | 6/2000 |
| JP | 2003-285709 A | 10/2003 |
| JP | 2004-291785 A | 10/2004 |
| JP | 2007-084014 A | 4/2007 |
| JP | 2008-037276 A | 2/2008 |
| JP | 2008-094235 A | 4/2008 |
| JP | 2009-023640 A | 2/2009 |
| JP | 2013-159304 A | 8/2013 |

* cited by examiner

*Primary Examiner* — Faye M Fleming
(74) *Attorney, Agent, or Firm* — Dinsmore & Shohl LLP

(57) ABSTRACT

A side airbag device for vehicle includes: a gas generator that is disposed in a seat cushion side part in a vehicular seat and generates a gas for inflation and deployment by actuation; and a side airbag in which the inside thereof is partitioned into an upper chamber and a lower chamber by a up-down dividing tether having a connecting hole and the gas from the gas generator is supplied to the lower chamber.

13 Claims, 9 Drawing Sheets

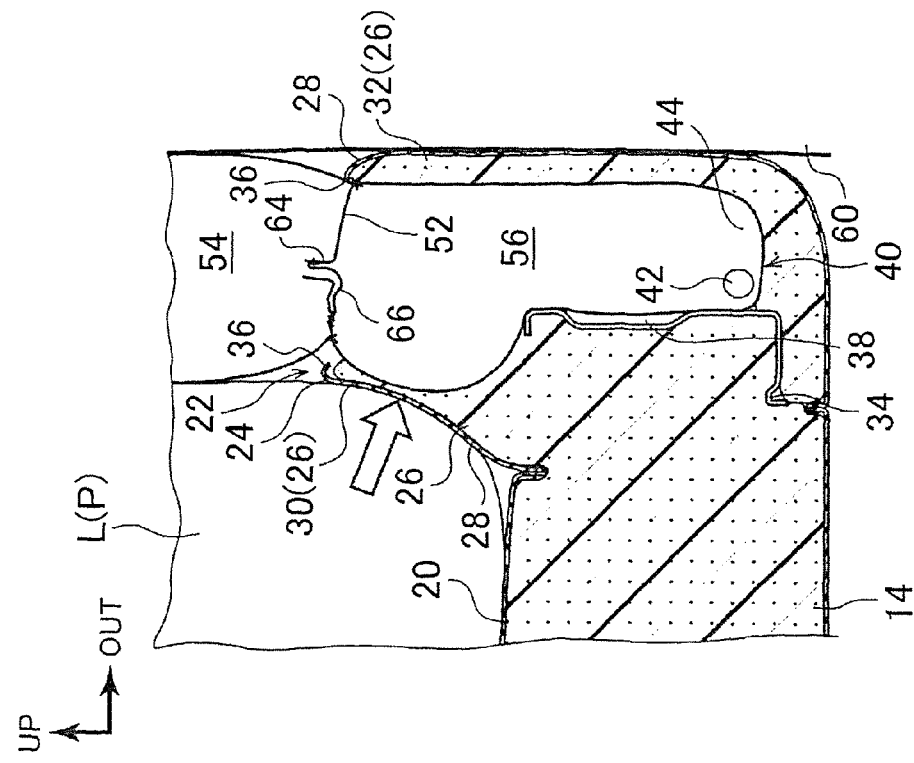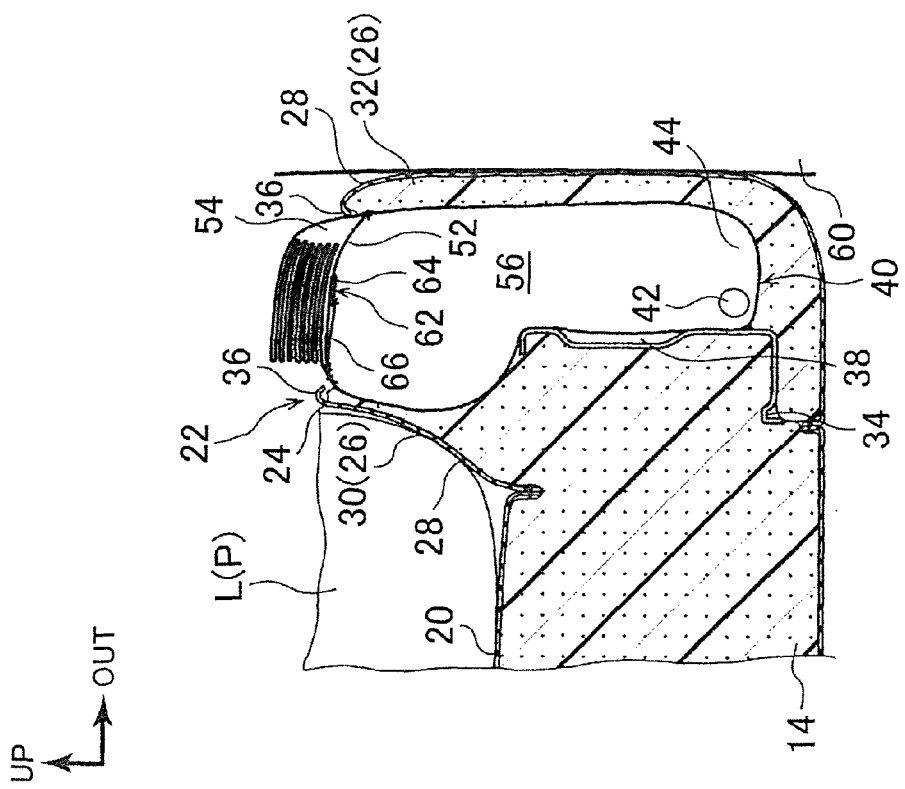

SIDE AIRBAG DEVICE FOR VEHICLE

INCORPORATION BY REFERENCE

The disclosure of Japanese Patent Application No. 2013-194220 filed on Sep. 19, 2013 including the specification, drawings and abstract is incorporated herein by reference in its entirety.

BACKGROUND OF THE INVENTION

1. Field of the Invention

The present invention relates to a side airbag device for vehicle.

2. Description of Related Art

Japanese Patent Application Publication No. 2000-177527 (JP 2000-177527 A) discloses a constitution that includes a side airbag in which an upper chamber and a lower chamber, which are different in internal pressure each other during inflation and deployment, are disposed in a vehicle vertical direction in a seat back of a vehicular seat. Specifically, a gas generator and the side airbag that is constituted of the upper chamber that is made expandable at the side of a chest region of an occupant and the lower chamber that is made expandable at the side of a pelvis of the occupant are disposed in the seat back. The upper chamber and the lower chamber are filled with a gas by the gas generator such that internal pressures in the respective filled states are different and are made expandable.

According to the constitution described above, during a vehicle side collision (hereinafter, referred to as "side collision"), the gas is filled in the upper chamber and lower chamber from the gas generator, and impact to a chest region and pelvis of the occupant can be alleviated thereby. At this time, when the internal pressure of the upper chamber disposed at the side of the chest region is set lower than the internal pressure of the lower chamber disposed at the side of the pelvis, the impact to the chest region that is relatively weak to load can be alleviated by the upper chamber of low load.

On the other hand, Japanese Patent Application Publication No. 2003-285709 (JP 2003-285709 A) discloses a constitution in which a first side airbag device is disposed in a seat cushion of a vehicular seat, and a second side airbag device is disposed in a seat back. Specifically, this constitution includes the first side airbag that is disposed on the seat cushion side and protects a lumbar part and a part lower than that of an occupant, and the second side airbag that is disposed on a seat back side, protects an abdominal part and a part higher than that of the occupant, and is provided with a vent hole.

According to the constitution described above, when the first side airbag and second side airbag are deployed during the vehicle side collision, since the first side airbag is not provided with the vent hole, the internal pressure is maintained at a high level. Thus, the lumbar part and the part lower than that of the occupant can be moved to a non-collision side. On the other hand, in the second side airbag, since the vent hole is provided, the internal pressure decreases. Thus, the chest part and the like of the occupant can be protected with the second side airbag of low load.

Further, Japanese Patent Application Publication No. 2008-094235 (JP 2008-094235 A) discloses a constitution in which a side airbag of which stiffness is different in a vehicle longitudinal direction is disposed in a seat cushion of a vehicular seat. Specifically, this constitution includes a side airbag for lumbar part for absorbing a shock energy to the lumbar part by restraining the lumbar part of an occupant, and a side airbag for thigh part which has the stiffness or the like different from the side airbag for lumbar part and absorbs the shock energy to the thigh part by restraining the thigh part. Further, the stiffness of the side airbag for thigh part is set higher than that of the side airbag for lumbar part.

According to the constitution described above, when the side airbag for lumbar part and the side airbag for thigh part are deployed under a gas supply from the gas generator during the vehicle side collision, the internal pressure of the side airbag for thigh part becomes higher than the internal pressure of the side airbag for lumbar part. As a result, by the side airbag for thigh part of which stiffness is set higher, the thigh part of the occupant is restrained. Therefore, a pubic bone load that is input particularly to the pubic bone part of the lumbar part of the occupant can be reduced with a small energy absorption stroke.

However, when the constitution disclosed in JP 2000-177527 A is used, the side airbag having the upper chamber and the lower chamber is disposed in the seat back of the vehicular seat. That is, since there is a relatively long distance from the side airbag to the lumbar part of the occupant seated on the vehicular seat, there is a room for improvement from the viewpoint of improving the restraining property of the lumbar part of the occupant (first problem).

Further, since the side airbag is disposed at the side of chest part, there is a room for improvement of the restraining performance of the lumbar part and a part lower than that of the occupant, in particular, the pubic bone part and femur bone that are near a seat surface of the seat cushion (second problem).

Further, there is a room for improvement from a point that the side airbag that restrains the lumbar part of the occupant is controlled to optimum internal pressures in accordance with immunity values to loads of the respective sites of the occupant. That is, there is a room for improvement from a point that at the pubic bone part and femur bone that are relatively high in the immunity value to the loads and an iliac bone part that is relatively low in the immunity value, the side airbag is controlled to the optimum internal pressures in accordance with the immunity values of the respective sites. Further, the same can be said regarding the lumbar part that are relatively high in the immunity value to the load and the abdominal part that is relatively low in the immunity value (third problem).

On the other hand, according to the constitution disclosed in JP 2003-285709 A, the first side airbag device is constituted to be disposed in the seat cushion. Therefore, the first problem and second problem can be solved. However, the third problem still remains in an unsolved state. That is, the pubic bone part and femur bone that are relatively high in the immunity value and the iliac bone part that is relatively low in the immunity value are restrained by the first side airbag device having the same internal pressure. Further, since the first side airbag device is not provided with the vent hole, the internal pressure of the side airbag is maintained at a high level. Therefore, the iliac bone part is restrained by the side airbag having high internal pressure.

Further, in the case when the constitution disclosed in JP 2008-094235 A is used, since a constitution in which the side airbag for thigh part and the side airbag for lumbar part are disposed, and the side airbag for thigh part is set to higher internal pressure than that of the side airbag for lumbar part is adopted, the third problem can be solved. However, the side airbag for thigh part disposed on a front side in the vehicle longitudinal direction is constituted to be high in the internal pressure. Therefore, when an occupant is out of position, there is a room for improvement from the viewpoint of suppressing an influence on the occupant.

SUMMARY OF THE INVENTION

The present invention provides a side airbag device for vehicle, which can make it possible to improve a deployment performance to an occupant lumbar part and to properly restrain in accordance with the immunity values of the respective sites of an occupant, and, can suppress an influence on the occupant when the occupant is out of position.

An aspect of the present invention relates to a side airbag device for vehicle. The side airbag device for vehicle includes a gas generator that is disposed in a seat cushion side part in a vehicular seat and generates a gas for inflation and deployment by actuation and a side airbag in which the inside thereof is partitioned into an upper chamber and a lower chamber by an up-down dividing tether having a connecting hole and the gas from the gas generator is supplied to the lower chamber.

According to the aspect described above, during the vehicle side collision, the gas generator disposed in the seat cushion side part is actuated and gas is generated thereby, and the gas is supplied to the side airbag housed in the seat cushion side part in a folded-up state. Therefore, the side airbag is inflated and deployed toward the occupant from a seat cushion nearer to a lumbar part side and a thigh part side of the occupant in a proper seating position to the vehicular seat. Thus, the side airbag can be inflated and deployed in an early stage toward the lumbar part and the thigh part in which a side airbag deployment gap is narrow, and the side airbag that is inflated and deployed receives the lumbar part and thigh part of the occupant that moves under inertia.

Here, according to the aspect of the present invention described above, since the up-down dividing tether is disposed so as to divide the inside of the side airbag into the upper chamber and the lower chamber, and the gas in the gas generator is supplied to the lower chamber, the lower chamber is inflated and deployed in advance. Then, when the gas is supplied from the lower chamber to the upper chamber via the connecting hole of the up-down dividing tether, the upper chamber is inflated and deployed. Thus, the lower chamber is high in the internal pressure and the upper chamber is relatively low in the internal pressure. As a result, when the occupant is out of position, the load on the occupant can be reduced.

Therefore, the side airbag device for vehicle according to the aspect described above has an excellent effect that it makes it possible to improve the deployment performance to an occupant lumbar part in a proper seating position and to restrain properly in accordance with the immunity value of each of sites of the occupant in a proper seating position, and can suppress an influence on the occupant out of position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8A is an expanded cross-sectional view that corresponds to FIG. 3 that shows an initial state when a side airbag device for vehicle according to a second embodiment of the present invention is actuated;

FIG. 8B is an expanded cross-sectional view that shows a final state when the side airbag device for vehicle is further actuated from the state shown in FIG. 8A.

DETAILED DESCRIPTION OF EMBODIMENTS

First Embodiment

Figure 1:
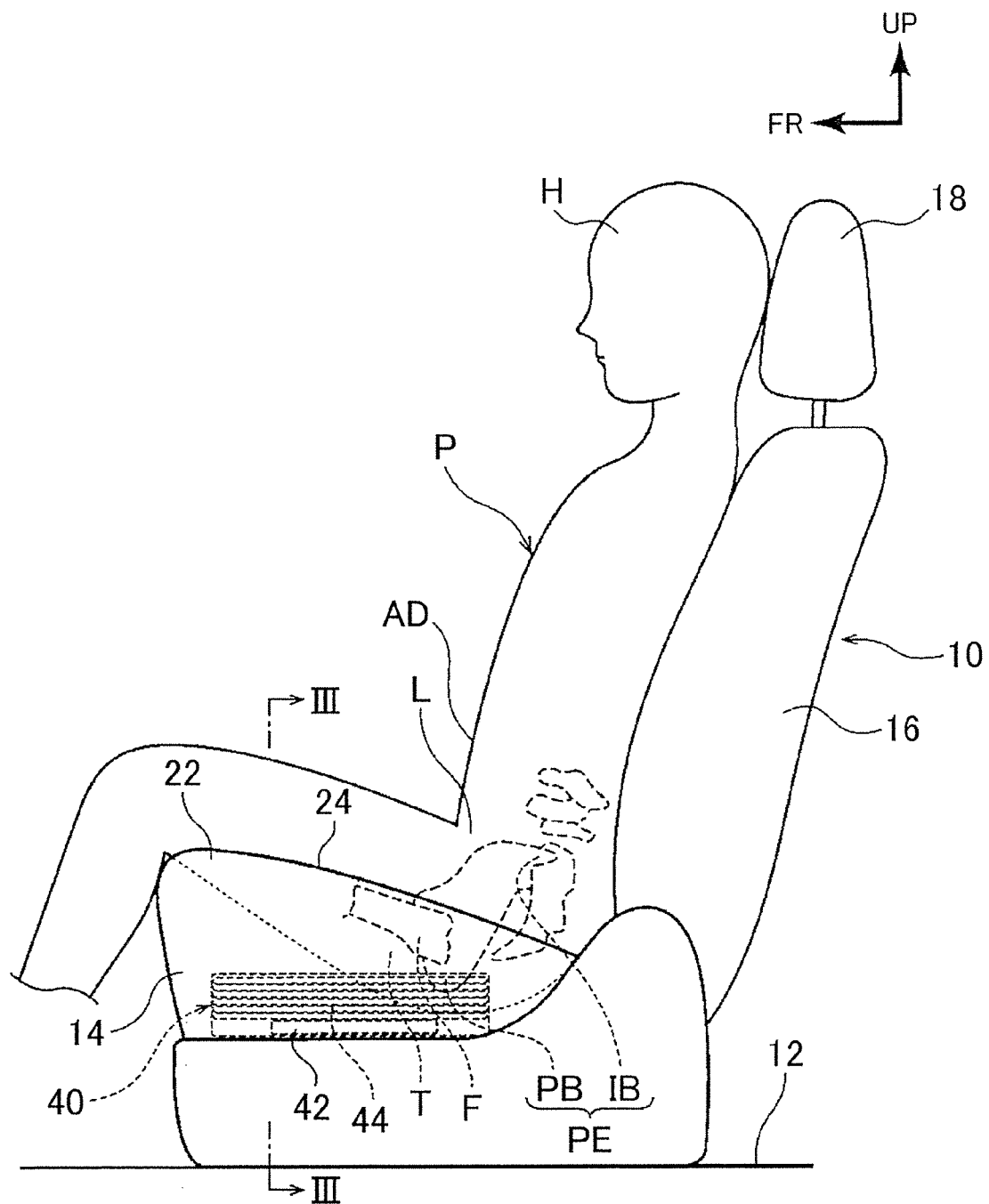
FIG. 1 is a side view of a vehicular seat that shows a state during non-actuation of a side airbag device for vehicle according to a first embodiment of the present invention.

Hereinafter, a first embodiment of a side airbag device for vehicle according to the present invention will be described with reference to FIG. 1 to FIG. 7. In the drawings, an optionally shown arrow mark FR shows a vehicle front direction, an arrow mark OUT shows a vehicle left direction (one side in a vehicle width direction), and an arrow mark UP shows an upper direction.

As shown in FIG. 1, a vehicular seat 10 includes a seat cushion 14 that is slidably supported by a seat rail (not shown) that is fixed to a vehicle body floor 12 and a seat back 16 that becomes a backrest of an occupant P seated on the seat cushion 14. Further, at an upper end of the seat back 16, a head rest 18 that corresponds to a head part H of the occupant P is disposed.

Figure 2:
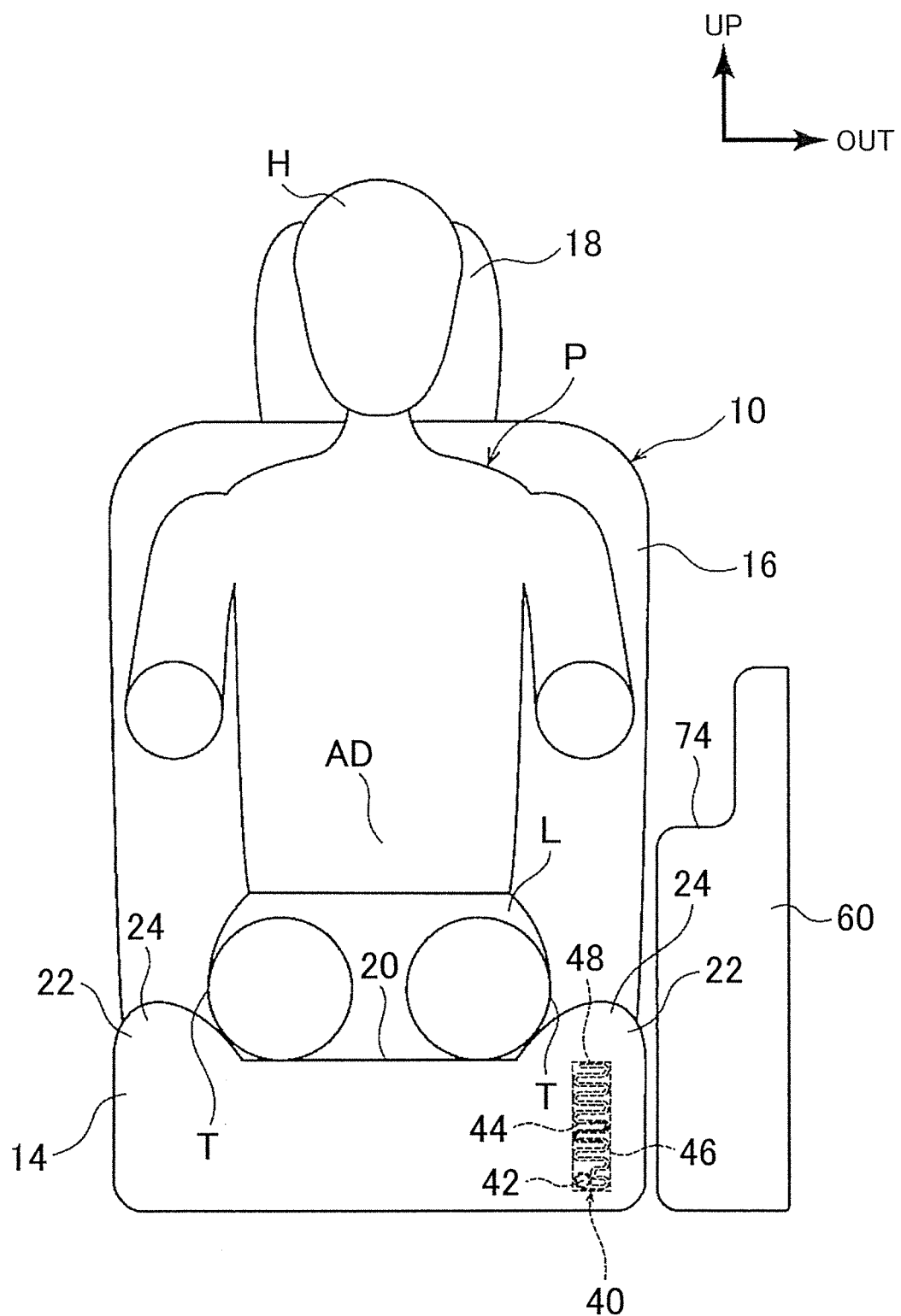
FIG. 2 is a front view of the vehicular seat that shows a state during non-actuation of the side airbag device for vehicle according to the first embodiment of the present invention.

As shown in FIG. 2, at a center part of the seat cushion 14, a center seat surface part 20 that is formed into a gradual curve on which the occupant P seats is disposed. On both side end sides of the center seat surface part 20, seat cushion side supports 22 as a seat cushion side part, which are formed into a convectional shape to a vehicle upward direction are disposed, and can suppress the occupant P from moving in a vehicle width direction. Further, the pubic bone part PB of the pelvis PE and femur bone F of the thigh part T in the occupant P are located on a vehicle lower side of an apical part 24 as an upper end part of the seat cushion side support 22 (see FIG. 1). The seating position of the occupant P in this state is called a "proper seating position".

Figure 3:
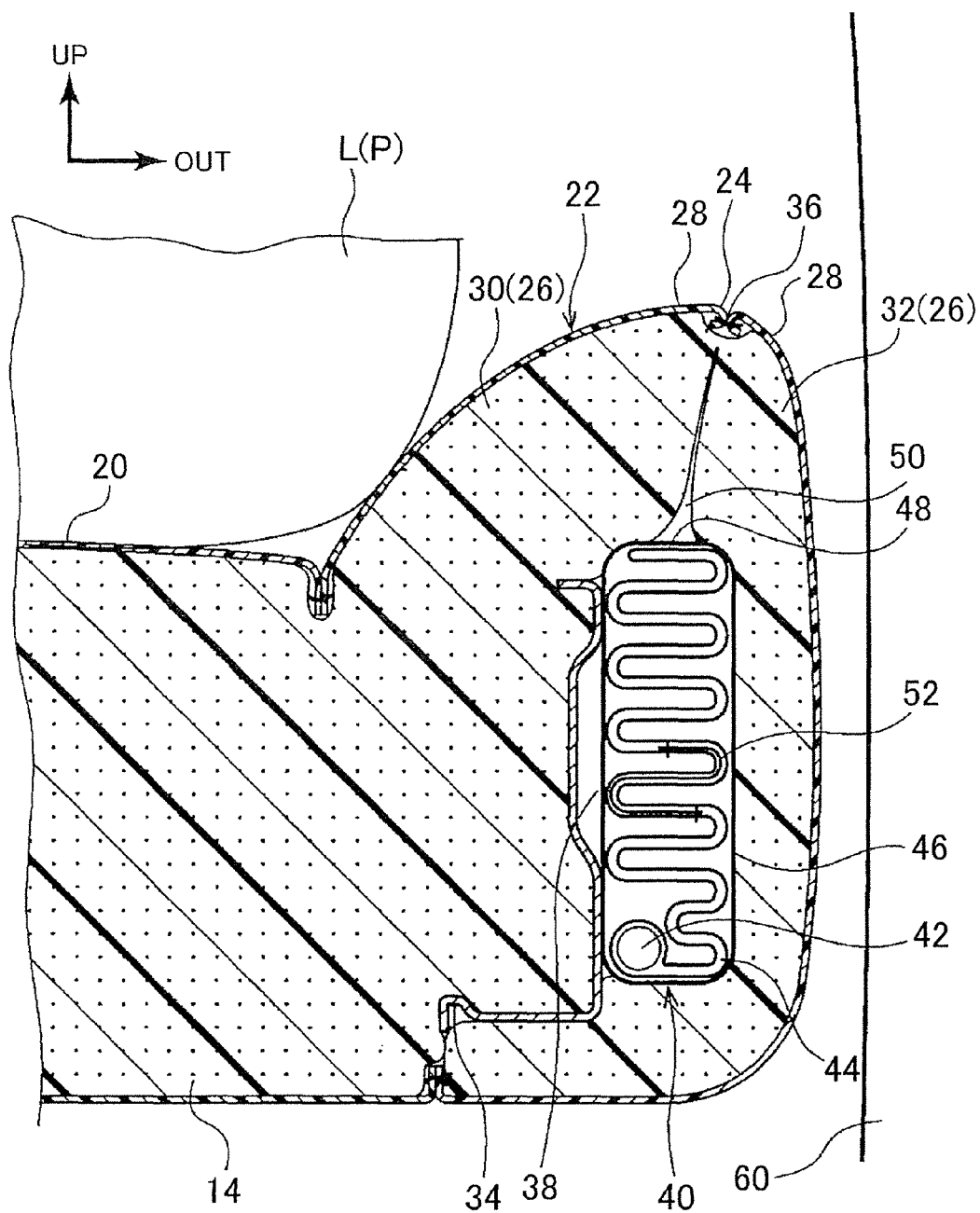
FIG. 3 is an expanded cross-sectional view that shows a state when the vehicular seat shown in FIG. 1 is cut along a line in enlargement.

As shown in FIG. 3, the seat cushion side support 22 is constituted of a seat cushion pad 26 made of a urethane raw material that is formed into a shape projected toward a vehicle upper direction and a seat surface skin 28 that covers the seat cushion pad 26. At the apical part 24 of the seat cushion side support 22, a sewn part 36 in which the seat surface skin 28 of a cabin inner side part 30 and the seat surface skin 28 of a cabin outer side part 32 are sewn with each other is disposed. Further, the seat cushion side support 22 includes a housing part 38 that is a space of a nearly box body shape in inward of the seat cushion pad 26 and on a vehicle outside of a side frame 34 of a seat frame (not shown).

A side airbag device for vehicle 40 is housed in the housing part 38 and attached to the side frame 34. This side airbag device for vehicle 40 is constituted of an inflator 42 as a gas generator and the side airbag 44 that is inflated and deployed by receiving a supply of gas spouted from the inflator 42 as a main part. The side airbag 44 is folded up into concertinas as an example and covered with a protective cloth 46 together with the inflator 42. An upper end part 48 of the side airbag 44 that is folded up into concertinas is disposed so as to face the apical part 24 of the seat cushion side support 22. Further, in the seat cushion pad 26 disposed between the upper end part 48 and the apical part 24 of the side airbag 44, a notch is formed such that the side airbag 44 can be readily inflated and deployed, and a cleavage part 50 is formed by the notch. The inflator 42 is disposed in the lower chamber 56 described below of the side airbag 44.

The inflator 42 is formed into a nearly cylindrical shape and is fastened to the above-described side frame 34 with a bolt and a nut (not shown). Although this inflator 42 is formed into a nearly cylindrical shape, a disc type inflator that is formed into a nearly disc shape may be used. Further, although this inflator 42 is a type in which a large amount of gas is generated by burning a gas generating agent charged inside thereof by electrically connecting to an ignition device (not shown), without limiting thereto, a type in which pressurized gas is encapsulated may be used.

Figure 4:
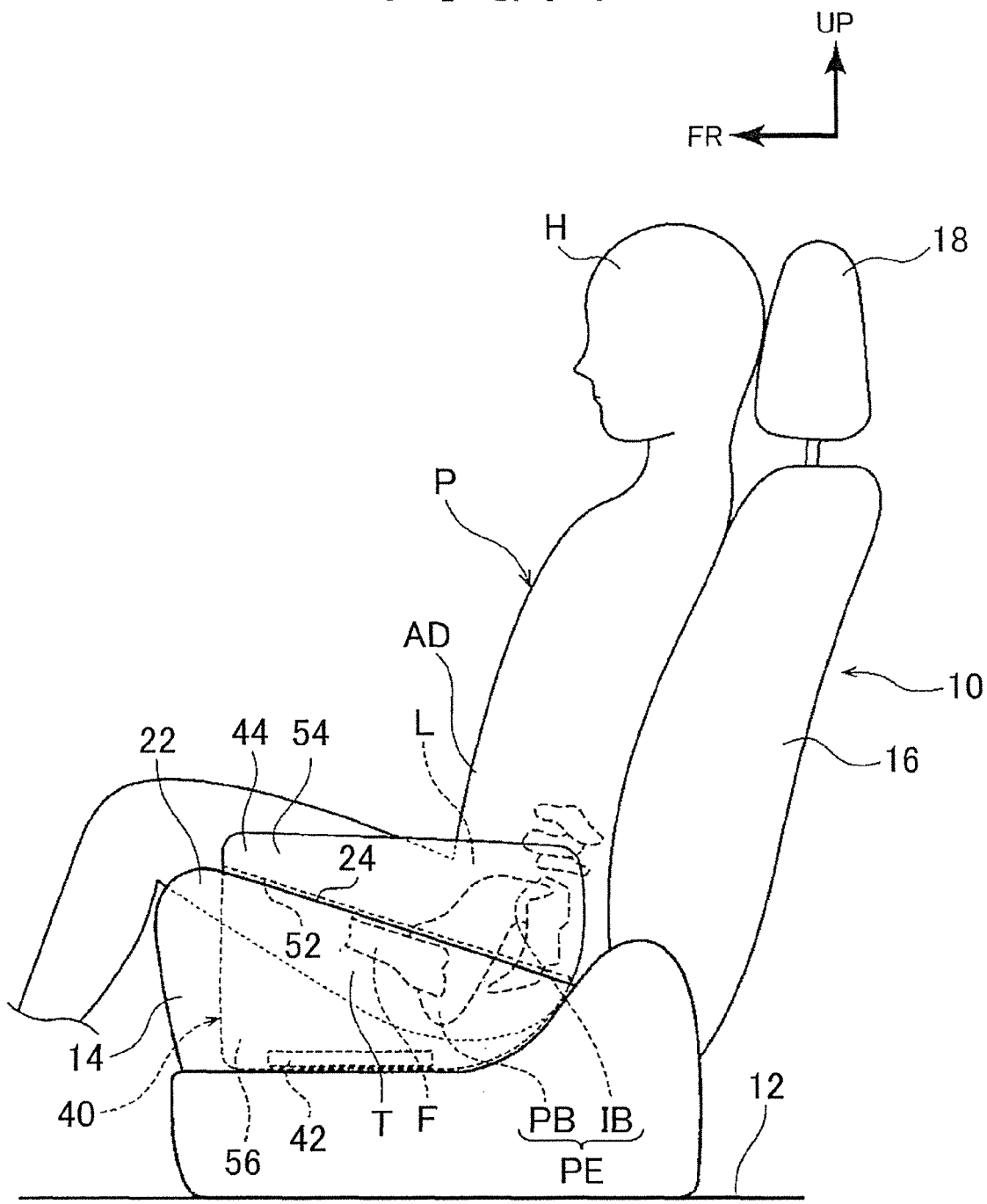
FIG. 4 is a side view that corresponds to FIG. 1 that shows a state when the side airbag device for vehicle is actuated from the state shown in FIG. 1.

As shown in FIG. 4, the side airbag 44 is formed into a rectangular shape in a side view during inflation and deployment, and inside of the side airbag 44, the up-down dividing tether 52 that partitions the inside of the side airbag 44 in an up-and-down direction is disposed. Thus, the inside of the side airbag 44 is partitioned into the upper chamber 54 and the lower chamber 56. Further, the inflator 42 is disposed inside of the lower chamber 56. A shape in the side view during inflation and deployment of the side airbag 44 may be other shapes without limiting to the rectangular shape.

The up-down dividing tether 52 is made of the same material as that of the side airbag 44. Further, by sewing a peripheral part with an inside surface of the side airbag 44, the up-down dividing tether 52 is attached to the side airbag 44. Further, the up-down dividing tether 52 is disposed so as to be arranged along the apical part 24 of the seat cushion side support 22 in the side view during inflation and deployment of the side airbag 44. Specifically, although the apical part 24 of the seat cushion side support 22 is inclined to a vehicle lower side from a vehicle front toward a vehicle back in the side view, also the up-down dividing tether 52 is inclined to a vehicle lower side from a vehicle front toward a vehicle back similarly in the side view. That is, the up-down dividing tether 52 is disposed on a diagonal line of the side airbag 44. In other words, the up-down dividing tether 52 is disposed inside of the side airbag 44 so as to take a position on a vehicle upper side of the thigh part T, the femur bone F and the pubic bone part PB of the occupant P seated in a proper seating position and on a vehicle lower side of the iliac bone part IB in the vehicle side view. Therefore, the lower chamber 56 of the side airbag 44 is set to inflate and deploy in the seat cushion 14 during inflation and deployment. The up-down dividing tether 52 may be disposed slightly displaced without strictly limiting to on the diagonal line of the side airbag 44.

That is, during inflation and deployment of the side airbag 44, at the side of the pubic bone part PB and the femur bone F of the occupant P seated on the vehicular seat 10, the lower chamber 56 is located. Similarly, at the side of the iliac bone part IB of the occupant P, the upper chamber 54 is located.

Figure 6:
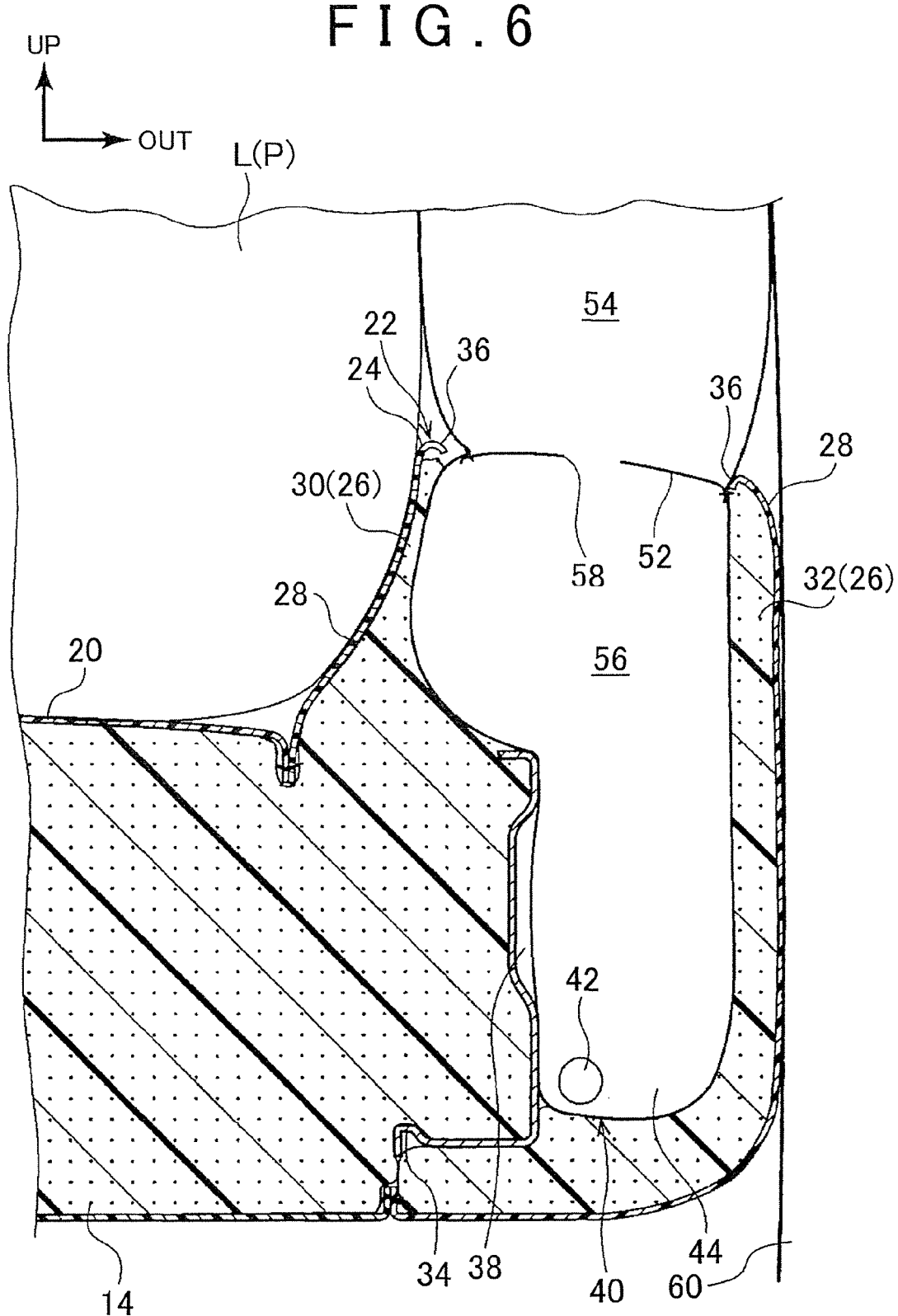
FIG. 6 is an expanded cross-sectional view that corresponds to FIG. 5 that shows a final state when the side airbag device for vehicle is further actuated from the state shown in FIG. 5.

Further, the up-down dividing tether 52 includes, at a near center part thereof, a connecting hole 58 that penetrates through in a plate thickness direction (see FIG. 6). By the connecting hole 58, internal spaces of the upper chamber 54 and the lower chamber 56 are connected with each other. Here, AD in the drawing shows an abdominal part of the occupant P, and L shows a lumbar part of the occupant P.

Operation/Effect of First Embodiment

Next, an operation and an effect of the first embodiment will be described.

As shown in FIGS. 1 and 2, in a usual time, the side airbag device for vehicle 40 is not actuated and the side airbag 44 is housed in a folded state in the seat cushion side support 22.

When this state changes to a vehicle side collision state, a side collision sensor detects a vehicle side collision state and this signal is input to an airbag ECU (both is not shown in the drawing). The airbag ECU determines whether the side airbag device for vehicle 40 is actuated based on the input signal, and when "actuation of the side airbag" is determined, a predetermined electric current is supplied to the inflator 42. Thus, the inflator 42 is actuated and gas is generated thereby.

Figure 5:
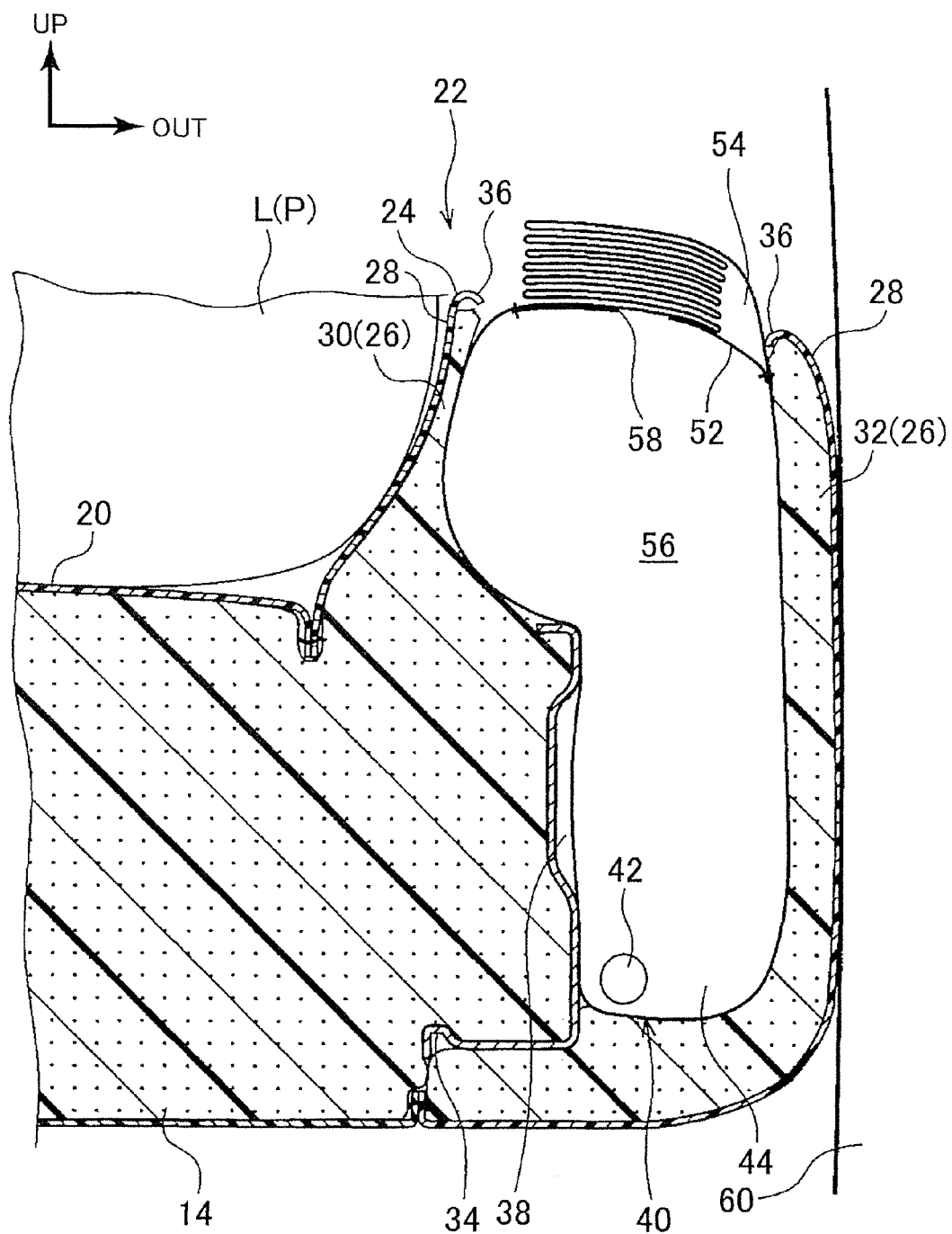
FIG. 5 is an expanded cross-sectional view that corresponds to FIG. 3 that shows an initial state when the side airbag device for vehicle is actuated from the state shown in FIG. 3.

According to the present embodiment, as shown in FIG. 4, the up-down dividing tether 52 that is a partition that divides an internal space of the side airbag 44 into the upper chamber 54 and the lower chamber 56 is disposed on a diagonal line in the side airbag 44. Further, the inflator 42 is disposed in the lower chamber 56. Therefore, the gas generated from the inflator 42 is supplied to the lower chamber 56, and, as shown in FIG. 5, preceding the upper chamber 54, the lower chamber 56 is inflated. Thus, the seat cushion side support 22 itself is also inflated. That is, when the side airbag 44 is inflated to an upper side of an inside of the seat cushion side support 22 by receiving a deployment reaction force to the side frame 34, the sewn part 36 disposed at the apical part 24 of the of the seat cushion side support 22 is cleaved. Simultaneously therewith, the cabin outer side part 32 of the seat cushion side support 22 is pushed toward a door trim 60. At the same time, the cabin inner side part 30 of the seat cushion side support 22 on the opposite side is pushed to the cabin inner side by an upper part of the inflated lower chamber 56. By the cabin inner side part 30 of the seat cushion side support 22 pushed toward cabin inner side, the lumbar part L of the occupant P is restrained. Then, the gas supplied to the lower chamber 56 side, after contribution to the inflation of the lower chamber 56, as shown in FIG. 6, flows in the upper chamber 54 side via the connecting hole 58 and inflates and deploys the upper chamber 54.

Further, during this vehicle side collision, the occupant P moves by inertia to a vehicle width direction outside. In the present embodiment, the occupant P seated in a proper seating position moves by inertia toward the door trim 60. At this time, as shown in FIG. 4, in an inertia movement direction of the pubic bone part PB and the femur bone F of the occupant P, the lower chamber 56 that is inflated in advance and maintains high internal pressure is present. Therefore, the pubic bone part PB and the femur bone F of the occupant P are received by the lower chamber 56. In general, the pubic bone part PB and the femur bone F are relatively high in the immunity value to the input of load. Therefore, the pubic bone part PB and the femur bone F of the occupant P are effectively restrained by the lower chamber 56 that maintains high internal pressure.

Further, the iliac bone part IB of the occupant P at this time is received by the upper chamber 54 of which internal pressure is lower than that of the lower chamber 56. In general, the iliac bone part IB is relatively low in the immunity value to the input of load. Therefore, the iliac bone part IB of the occupant P is restrained by an appropriate reaction force by the upper chamber 54 of which internal pressure is low.

Figures 7A, 7B:
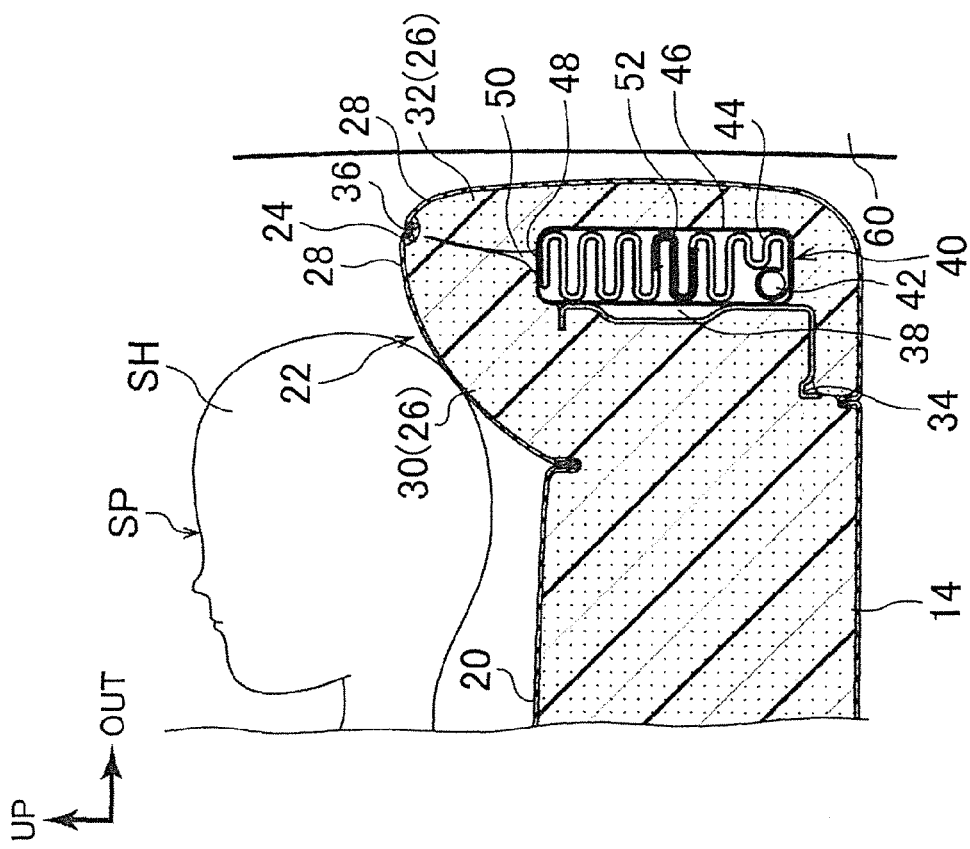
FIG. 7A is an expanded partial cross-sectional view of a seat cushion according to the first embodiment of the present invention that shows a situation when an occupant is out of position.
FIG. 7B is an expanded partial cross-sectional view that shows a state when the side airbag device for vehicle is actuated from a state of FIG. 7A.

On the other hand, as shown in FIG. 7A, as an example in which the occupant P is seated out of position, there is a state in which an occupant SP having a small constitution such as a child or the like (hereinafter, referred to as "small occupant") lays on the seat cushion 14. A head part SH of the small occupant SP at this time is located on the seat cushion side support 22. When the side airbag device for vehicle 40 is actuated in this state, the lower chamber 56 is deployed and inflated in the seat cushion side support 22. Thereafter, the upper chamber 54 is inflated and deployed from the sewn part 36 of the seat cushion side support 22 to a cabin upper side. Since the upper chamber 54 at this time is inflated and deployed behind the lower chamber 56 and gas is supplied from the lower chamber 56, the upper chamber 54 is set to relatively low in the internal pressure to the lower chamber 56. Therefore, as shown in FIG. 7B, since what comes into direct contact with the head part SH of the small occupant SP is the upper chamber 54 of which internal pressure is set low and a time necessary to inflate and deploy is later than the lower chamber 56, load on the small occupant SP can be effectively reduced.

Thus, according to the present embodiment, since the lower chamber 56 is high in the internal pressure and the upper chamber 54 is relatively low in the internal pressure, it possible to improve the deployment performance to the lumbar part L of the occupant P seated in a proper seating position and to appropriately restrain in accordance with the immunity values of the respective sites of the occupant P in a proper seating position. Also, by reducing load on the small occupant SP out of position, an influence applied on the small occupant SP out of position can be suppressed.

Further, according to the present embodiment, when the up-down dividing tether 52 is disposed on a diagonal line, the inside of the airbag can be partitioned in a vehicle longitudinal direction. Therefore, the upper chamber 54 and the lower chamber 56 that are different in the internal pressure in the vehicle longitudinal direction can be disposed. That is, the pubic bone part PB of the lumbar part L and the femur bone F, which are located on a vehicle front side and relatively high in the immunity values to the load are restrained by the lower chamber 56 having high internal pressure. On the other hand, the iliac bone part IB of the lumbar part L which is located on a vehicle back side and relatively low in the immunity value to the load is restrained by the upper chamber 54 having low internal pressure. Therefore, the pubic bone part PB and the femur bone F are restrained under high load, and the iliac bone part IB is restrained under low load. Therefore, the side airbag device for vehicle 40 according to the present embodiment has an excellent effect that it can properly restrain the thigh part T and the lumbar part L of the occupant P in a proper seating position in accordance with the immunity values of the respective sites.

Further, according to the present embodiment, the pubic bone part PB and the femur bone F of the lumbar part L that is located at the side of the seat cushion side part are restrained under high load via the seat cushion side part by the lower chamber 56 having high internal pressure. Further, the iliac bone part IB of the lumbar part L that is located above the seat cushion side part is directly restrained under low load by the upper chamber 54 having low internal pressure. Together therewith, when the occupant P is out of position, since the upper chamber 54 that comes into direct contact with the occupant P is inflated and deployed later than the lower chamber 56 and is relatively low in the internal pressure, the load on the occupant P can be reduced. Therefore, the side airbag device for vehicle 40 according to the present embodiment has excellent effect that it can properly restrain the thigh part T and the lumbar part L of the occupant P in a proper seating position in accordance with the immunity values of the respective parts, and, at the same time, can reduce the load on the occupant P seated out of position.

Further, according to the present embodiment, the lower chamber 56 having high internal pressure is neither inflated nor deployed directly toward the occupant P but is inflated and deployed in the seat cushion side part. That is, when the occupant P is in a proper seating position, although the lumbar part L and the thigh part T of the occupant P are located at the side of the seat cushion side part, when the lower chamber 56 having high internal pressure is inflated and deployed, the lumbar part L and the thigh part T at this position are properly restrained via the seat cushion side part. On the other hand, when the occupant P is out of position, since the lower chamber 56 does not come into direct contact with the occupant P, the load on the occupant P can be reduced. Therefore, the side airbag device for vehicle 40 according to the present embodiment has an excellent effect that the thigh part T and the lumbar part L of the occupant P in a proper seating position can be properly restrained in accordance with the immunity values of the respective sites and the load on the occupant P seated out of position can be reduced.

Second Embodiment

Next, with reference to FIG. 8, a side airbag device for vehicle according to a second embodiment of the present invention will be described. The same constituent components as the first embodiment described above will be imparted with the same reference numerals and descriptions thereof are omitted.

As shown in FIGS. 8A and 8B, the side airbag device for vehicle 40 according to this second embodiment has basically the same constitution as the first embodiment and is characterized in a point that a variable vent tube 62 is disposed to the connecting hole 58 of the up-down dividing tether 52 as an exhaust mechanism. This exhaust system makes the gas stay in the lower chamber during inflation and deployment of the side airbag and makes the gas supply into the upper chamber when an external force is applied to the lower chamber.

That is, at an approximate center of the up-down dividing tether 52 (a position at which the connecting hole 58 of the first embodiment is formed), a socks-like vent tube 64 is disposed. The vent tube 64 is made of the same material as the side airbag 44 and has a flexible structure. Further, both a base end part and an apical end part of the vent tube 64 are opened and the upper chamber 54 and the lower chamber 56 are mutually connected via the vent tube 64.

To the vehicle lower side and the cabin inner side of the up-down dividing tether 52, one end part of a belt-like vent tube tether 66 is attached by sewing. Further, the other end part of the vent tube tether 66 is attached to the apical end part of the vent tube 64 by sewing.

When the lower chamber 56 is inflated and deployed, the vent tube 64 is protruded toward the lower chamber 56 and is folded up on the cabin inner side. In this state, the vent tube tether 66 is set to a length of degree that is under tension but not in slack.

Operation/Effect of the Second Embodiment

Next, an operation and an effect of the second embodiment will be described.

Also in the present embodiment, since the side airbag 44 is provided with the up-down dividing tether 52, fundamentally, the same operation and effect as the above-described first embodiment can be obtained. That is, during vehicle side collision, the pubic bone part PB and the femur bone F of the occupant P are effectively restrained by the lower chamber 56 that maintains high internal pressure.

Here, although the lower chamber 56 is inflated ad deployed by a gas supply from the gas generator during the vehicle side collision, the gas is not supplied from the lower chamber 56 to the upper chamber 54 by the exhaust mechanism, and only the lower chamber 56 is inflated and deployed. Specifically, when the lower chamber 56 is inflated and deployed, the vent tube 64 of the up-down dividing tether 52 holds a folded-up state with the vent tube tether 66. That is, since the vent tube 64 that mutually connects the upper chamber 54 and the lower chamber 56 is set to a closed state, the gas supplied from the inflator 42 to the lower chamber 56 is made to stay in the lower chamber 56 without flowing into the upper chamber 54.

In this state, when the lumbar part L of the occupant P in a proper seating position is moved under inertia by the vehicle side collision, the lower chamber 56 is deformed to a direction to be collapsed. Due to the deformation, the exhaust system is opened, the gas is supplied from the lower chamber 56 to the upper chamber 54, and the upper chamber 54 is inflated and deployed thereby. Specifically, in a state in which only the lower chamber 56 is inflated and deployed, when an external force is applied, that is, when the lumbar part L of the occupant P in a proper seating position is moved toward the door trim 60 side in a vehicle width direction under inertia by the vehicle side collision, as shown in FIG. 8B, the lower chamber 56 is crushed to a cabin outer side. Thus, the tension of the up-down dividing tether 52 is relaxed, and, simultaneously therewith, also the tension of the vent tube tether 66 sewn to the up-down dividing tether 52 is relaxed. As a result, the vent tube 64 cannot hold the folded-up state and protrudes toward the upper chamber 54 by the pressurized gas in the lower chamber 56. Thus, the vent tube 64 becomes an open state and the upper chamber 54 and the lower chamber 56 are mutually connected. Therefore, the iliac bone part IB of the occupant P can be received by the upper chamber 54 that is inflated and deployed behind the lower chamber 56 and that has the internal pressure relatively lower than the lower chamber 56. That is, the iliac bone part IB of the occupant P can be restrained by a proper reaction force.

On the other hand, as described above, when the occupant P is out of position such as the small occupant SP lays on the seat cushion 14, the upper chamber 54 is not inflated and deployed by the variable vent tube 62. That is, when the lower chamber 56 is inflated and deployed during the vehicle side collision, since the vent tube 64 is in a closed state, the gas does not flow in the upper chamber 54. Further, when the occupant P is out of position, a force that crushes the lower chamber 56 does not work. Therefore, the upper chamber 54 is neither inflated nor deployed, and the load on the small occupant SP can be reduced.

Thus, according to the present embodiment, when the occupant P is in a proper seating position during the vehicle side collision, the upper chamber 54 is inflated and deployed later than the lower chamber 56 and becomes relatively low in the internal pressure. On the other hand, when the small occupant SP is out of position, the lower chamber 56 is not deformed to a direction to be crushed, and the upper chamber 54 is not inflated and deployed. Thus, the thigh part T and the lumbar part L of the occupant P in a proper seating position can be properly restrained in accordance with the immunity values of the respective sites in the thigh part T and the lumbar part L and, at the same time, the load on the small occupant SP out of position can be further reduced.

The side airbag device for vehicle 40 according to the present embodiment has an excellent effect such that the thigh part T and lumbar part L of the occupant P in a proper seating position can be properly restrained in accordance with the immunity values of the respective sites and the load on the occupant P out of position can be reduced.

Third Embodiment

Next, with reference to FIG. 9, a side airbag device for vehicle according to a third embodiment of the present invention will be described. The same constituent components as the above-described first embodiment are imparted with the same reference numerals and descriptions thereof are omitted.

Figure 9:
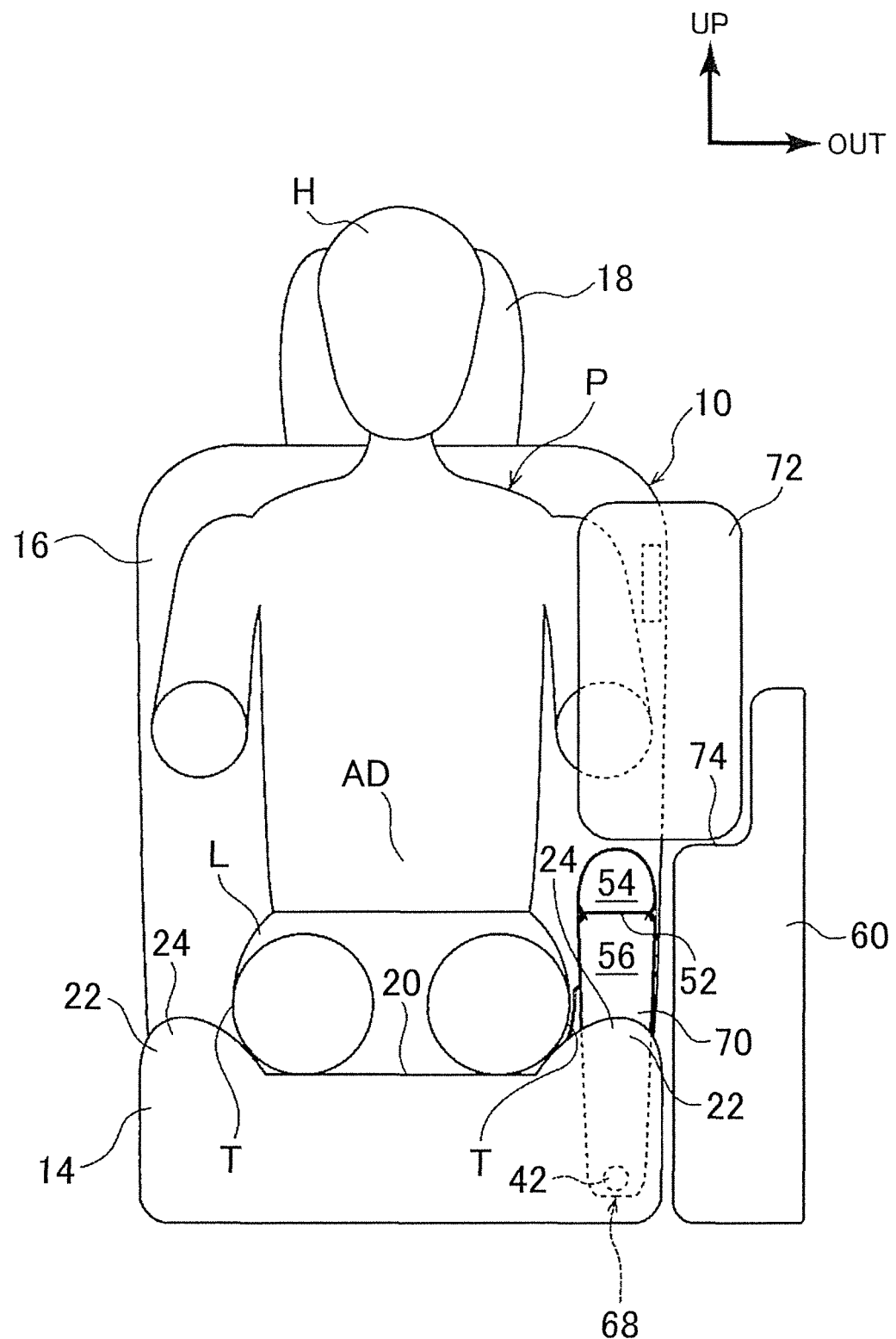
FIG. 9 is a front view that corresponds to FIG. 2 that shows a state when a side airbag device for vehicle according to a third embodiment of the present invention is actuated.

As shown in FIG. 9, in a side airbag device for vehicle 68 according to this third embodiment, a fundamental constitution is set the same as the first embodiment and is characterized in a point that an upper terminal of the side airbag 70 during deployment is extended to an armrest part 74 of the door trim 60. Further, it is characterized in a point that the up-down dividing tether 52 is disposed between the lumbar part L and the abdominal part AD of the occupant P.

According to the present embodiment, the side airbag 70 is set such that the upper chamber 54 is located at the side of the abdominal part AD of the occupant P seated in the vehicular seat 10 during inflation and deployment and the lower chamber 56 is located at the side of the lumbar part L of the relevant occupant P. Specifically, between the lumbar part L and the abdominal part AD of the occupant P, the inside of the side airbag 70 is divided into the upper chamber 54 and the lower chamber 56. The armrest part 74 is disposed at the side of the abdominal part AD of the occupant P. Therefore, since an upper terminal of the side airbag 70 is extended to the armrest part 74 during the deployment, the upper chamber 54 is inflated and deployed at the side of the abdominal part AD of the occupant P.

To the seat back 16, a side airbag for chest 72, which is separately disposed, is disposed, and the side airbag for chest 72 is inflated and deployed above the armrest part 74 of the door trim 60. Thus, the chest part of the occupant P can be restrained.

Operation/Effect of Third Embodiment

Next, an operation and an effect of the third embodiment will be described.

Also in the present embodiment, since the up-down dividing tether 52 is disposed on the side airbag 70, fundamentally, the same action and the effect as the above-described first embodiment can be obtained. That is, during the vehicle side collision, proper restraint in accordance with the immunity values of the respective sites (abdominal part AD and lumbar part L) of the occupant P can be made possible.

In the present embodiment, the lower chamber 56 having high internal pressure restrains the lumbar part L having relatively high immunity value to the load, and the upper chamber 54 having low internal pressure restrains the abdominal part AD having relatively low immunity value to the load. Therefore, the lumbar part L can be restrained under high load and the abdominal part AD can be restrained under low load. Thus, the abdominal part AD and lumbar part L of the occupant P can be properly restrained in accordance with the respective immunity values.

In the above, embodiments of the present invention were described. However, the present invention is not restricted thereto. It goes without saying that in the range that does not deviate from the gist of the present invention, other than the above, various modifications can be applied.

What is claimed is:

1. A side airbag device for vehicle comprising:
    a gas generator that is disposed in a seat cushion side part in a vehicular seat and generates a gas for inflation and deployment by actuation; and
    a side airbag in which an inside thereof is partitioned into an upper chamber and a lower chamber by an up-down dividing tether having a connecting hole and the gas from the gas generator is supplied to the lower chamber, the side airbag is inflated and deployed in a rectangle in a vehicle side view during inflation and deployment, and the up-down dividing tether is disposed on a diagonal line that inclines to a vehicle lower side from a vehicle front to a vehicle back of the side airbag.

2. The side airbag device for vehicle according to claim 1, wherein
    the up-down dividing tether of the side airbag is disposed along an upper end part on the seat cushion side part in a vehicle side view during inflation and deployment of the side airbag.

3. The side airbag device for vehicle according to claim 1, wherein
    the connecting hole of the side airbag is provided with an exhaust mechanism that makes the gas stay in the lower chamber during inflation and deployment of the side airbag and makes the gas supply in the upper chamber when an external force is applied to the lower chamber.

4. The side airbag device for vehicle according to claim 3, wherein
    the exhaust mechanism is a variable vent tube.

5. The side airbag device for vehicle according to claim 4 wherein
    the variable vent tube includes a vent tube and a vent tube tether,
    the vent tube is disposed to the up-down dividing tether and formed in socks shape, both a base end part connected to the up-down dividing tether and an apical part being opened and connecting the upper chamber and the lower chamber;
    the vent tube tether is formed in belt-shape, one end part thereof being attached to a vehicle lower side of the up-down dividing tether and to a cabin side of the vent tube, the other end part being attached to an opposite side from the cabin in the apical part of the vent tube; and
    a length of the vent tube tether is set to a length in which the vent tube and the vent tube tether are under tension without slackness in a state in which the vent tube protrudes toward the lower chamber when the lower chamber is inflated and deployed.

6. The side airbag device for vehicle according to claim 1, wherein
    the lower chamber of the side airbag is set to be inflated and deployed in the seat cushion side part during inflation and deployment.

7. The side airbag device for vehicle according to claim 1, wherein
    the side airbag is set such that, during inflation and deployment of the side airbag, the upper chamber is located at the side of an abdominal part of an occupant seated on the vehicular seat and the lower chamber is located at the side of a lumbar part of the occupant.

8. The side airbag device for vehicle according to claim 1, wherein
    an upper terminal of the side airbag extends up to an armrest of a door trim during inflation and deployment.

9. The side airbag device for vehicle according to claim 1, wherein
    the up-down dividing tether is disposed between a lumbar part and an abdominal part of the occupant during inflation and deployment.

10. The side airbag device for vehicle according to claim 8, further comprising:
    a side airbag for chest disposed on a seat back separately from the side airbag
    wherein the side airbag for chest is inflated and deployed above the armrest of the door trim.

11. A side airbag device for vehicle comprising:
    a gas generator that is disposed in a seat cushion side part in a vehicular seat, the gas generator generates a gas for inflation and deployment by actuation; and
    a side airbag in which an inside thereof is partitioned into an upper chamber and a lower chamber by an up-down dividing tether having a connecting hole and the gas from the gas generator is supplied to the lower chamber, the side airbag is inflated and deployed in a rectangle in a vehicle side view during inflation and deployment, and the up-down dividing tether is disposed on a line that inclines to a vehicle lower side from a vehicle front to a vehicle back of the side airbag.

12. The side airbag device for vehicle according to claim 11, wherein the line is a diagonal line of the side airbag.

13. A side airbag device for vehicle comprising:
    a gas generator that is disposed in a seat cushion side part in a vehicular seat, the gas generator generates a gas for inflation and deployment by actuation; and
    a side airbag in which an inside thereof is partitioned into an upper chamber and a lower chamber by an up-down dividing tether having a connecting hole and the gas from the gas generator is supplied to the lower chamber, the side airbag is inflated and deployed in a rectangle in a vehicle side view during inflation and deployment, and the up-down dividing tether is disposed so as to be arranged along an apical part of a seat cushion side support in a side view during inflation and deployment of the side airbag.

* * * * *